United States Patent
Yu et al.

(10) Patent No.: US 10,834,208 B2
(45) Date of Patent: Nov. 10, 2020

(54) USER DEVICE DETERMINES WHETHER TO CREATE A NEW SESSION BASED ON SESSION TYPE INFORMATION

(71) Applicant: Huawei Technologies Co., Ltd., Shenzhen (CN)

(72) Inventors: Fang Yu, Beijing (CN); Hui Ni, Beijing (CN); Yan Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/412,071

(22) Filed: May 14, 2019

(65) Prior Publication Data

US 2019/0268422 A1 Aug. 29, 2019

Related U.S. Application Data

(63) Continuation of application No. PCT/CN2016/105750, filed on Nov. 14, 2016.

(51) Int. Cl.
*H04L 29/08* (2006.01)
*H04W 4/50* (2018.01)
(Continued)

(52) U.S. Cl.
CPC ............ *H04L 67/141* (2013.01); *H04L 29/06* (2013.01); *H04L 67/142* (2013.01);
(Continued)

(58) Field of Classification Search
CPC ..... H04L 29/06; H04L 67/141; H04L 67/142; H04L 67/167; H04L 67/148; H04L 67/14;
(Continued)

(56) References Cited

U.S. PATENT DOCUMENTS

2004/0078341 A1* 4/2004 Steichen .............. G06Q 20/382
705/64
2006/0064440 A1* 3/2006 Perry ...................... H04L 29/06
(Continued)

FOREIGN PATENT DOCUMENTS

CN 101022481 A 8/2007
CN 101155329 A 4/2008
(Continued)

OTHER PUBLICATIONS

"SM model with APN concept (update of definition, update of solution 4.2)," SA WG2 Meeting #115, Nanjing, P.R. China, S2-162630, pp. 1-8, 3rd Generation Partnership Project, Valbonne, France (May 23-27, 2016).
(Continued)

*Primary Examiner* — Le H Luu
(74) *Attorney, Agent, or Firm* — Leydig, Voit & Mayer, Ltd.

(57) ABSTRACT

A session processing method related to the field of wireless communications technologies is provided. The method discloses: obtaining, by user equipment (UE), session type information, where the session type information is used to indicate a type of a first session; and when a first application triggers a first service, determining, by the UE based on the session type information, whether a create session request needs to be initiated for the first service. According to the solutions provided in embodiments, before the create session request is initiated, the UE may determine whether to reuse a created session or create a new session. In this way, for a service that can reuse a created session, no new session needs to be created, thereby reducing signaling exchange between the UE and a network side.

19 Claims, 9 Drawing Sheets

(51) Int. Cl.
*H04L 29/06* (2006.01)
*H04W 88/02* (2009.01)
*H04W 48/18* (2009.01)
*H04W 76/10* (2018.01)
*H04W 16/02* (2009.01)

(52) U.S. Cl.
CPC .............. *H04L 67/146* (2013.01); *H04W 4/50* (2018.02); *H04W 16/02* (2013.01); *H04W 48/18* (2013.01); *H04W 76/10* (2018.02); *H04W 88/02* (2013.01)

(58) Field of Classification Search
CPC ............. H04L 41/0896; H04L 47/2408; H04L 61/2007; H04L 65/80; H04W 4/50; H04W 16/02; H04W 48/18; H04W 76/10; H04W 88/02; H04W 28/22; H04W 76/12; G06Q 10/10; G06Q 20/322; G06Q 20/382
See application file for complete search history.

(56) References Cited

U.S. PATENT DOCUMENTS

| | | | |
|---|---|---|---|
| 2010/0073457 A1 | 3/2010 | Xu | |
| 2010/0180319 A1 | 7/2010 | Hu et al. | |
| 2012/0192261 A1* | 7/2012 | Blot-Levevre | G06Q 20/322 726/10 |
| 2013/0042276 A1* | 2/2013 | Payette | H04W 28/22 725/62 |
| 2014/0204172 A1* | 7/2014 | Rodde | H04L 65/80 348/14.02 |
| 2015/0249956 A1* | 9/2015 | Salot | H04L 47/2408 370/328 |
| 2016/0086108 A1* | 3/2016 | Abelow | G06Q 10/10 705/7.29 |
| 2016/0142276 A1* | 5/2016 | Shomura | H04L 67/14 709/224 |
| 2016/0191631 A1* | 6/2016 | Haraszti | H04L 41/0896 709/227 |
| 2016/0301757 A1* | 10/2016 | Nelson | H04L 67/142 |
| 2017/0026334 A1* | 1/2017 | Youn | H04L 61/2007 |
| 2017/0289271 A1* | 10/2017 | Seed | H04L 67/148 |
| 2017/0366960 A1* | 12/2017 | Kim | H04W 76/12 |

FOREIGN PATENT DOCUMENTS

| | | |
|---|---|---|
| CN | 101394449 A | 3/2009 |
| CN | 101790134 A | 7/2010 |
| CN | 104301287 A | 1/2015 |
| CN | 106060900 A | 10/2016 |

OTHER PUBLICATIONS

"Interim Agreements based on Way forward on Solutions for Key Issue 1 on Network Slicing," SA WG2 Meeting #117, Kaohsiung, Taiwan, S2-166051, pp. 1-22, 3rd Generation Partnership Project, Valbonne, France (Oct. 17-21, 2016).

Motorola Mobility, Lenovo, "Interim agreement: Determination of NSSAI based on UE policy",SA WG2 Meeting #118 S2-166603(revision of S2-16xxxx),Nov. 14-28, 2016, Reno, Nevada,total 3 pages.

\* cited by examiner

USER DEVICE DETERMINES WHETHER TO CREATE A NEW SESSION BASED ON SESSION TYPE INFORMATION

CROSS-REFERENCE TO RELATED APPLICATIONS

This application is a continuation of International Application No. PCT/CN2016/105750, filed on Nov. 14, 2016, the disclosure of which is hereby incorporated by reference in its entirety.

TECHNICAL FIELD

Embodiments of this application relate to the field of wireless communications technologies, and in particular, to a session processing method, an apparatus, and a system.

BACKGROUND

Network slicing is a new network and service mode, and can better meet an individual requirement of each service of a consumer or an enterprise through network customization and management. In a core network architecture that uses the network slicing technology, user equipment (UE) may access a plurality of slices of different types, and simultaneously use different services provided by the plurality of slices.

When a network side receives a session request of the UE, the network side creates a session based on information carried in the session request. One session may serve different services. However, in the prior art, as long as a new application initiates a service, the UE initiates a create session process, and the network side determines whether to reuse a created session or create a new session. Consequently, signaling exchange between the UE and the network side is increased.

SUMMARY

This application describes a session processing method, an apparatus, and a system.

According to one aspect, an embodiment of this application provides a session processing method, and the method includes: obtaining, by user equipment UE, session type information, where the session type information is used to indicate a type of a first session; and when a first application triggers a first service, determining, by the UE based on the session type information, whether a create session request needs to be initiated for the first service. According to the solution provided in this embodiment, before the create session request is initiated, the UE may determine whether to reuse a created session or create a new session. In this way, for a service that can reuse a created session, no new session needs to be created, thereby reducing signaling exchange between the UE and a network side and alleviating network load.

In a possible design, the session type information includes a data network name DNN supported by the first session, and the session type information further includes at least one of a type of a service supported by the first session and a type of a slice supporting the first session.

In a possible design, the method further includes: obtaining, by the UE, an identifier of the first session.

In a possible design, the session type information includes a type of a session supported by a slice in which a UE-attached-to common control network function CCNF device is located, and the session supported by the slice in which the UE-attached-to CCNF device is located includes the first session.

In a possible design, the determining, by the UE based on the session type information, whether a create session request needs to be initiated for the first service includes: determining, by the UE based on the session type information and a preconfigured correspondence between the first application and a data network name DNN accessed by the first application and between the first application and a type of the first service or a type of a slice required for supporting the first service, whether there is a created session that supports the type of the first service and the DNN accessed by the first application. In this way, for a service that can reuse a created session, no new session needs to be created, thereby reducing signaling exchange between the UE and a network side and alleviating network load.

In a possible design, the obtaining, by user equipment UE, session type information includes: obtaining, by the UE, the session type information in a create session procedure; or obtaining, by the UE, the session type information in an initial attach procedure; or obtaining, by the UE, the session type information in a tracking area update procedure.

In a possible design, the obtaining, by user equipment UE, session type information includes: receiving, by the UE, a create session response message from a session management function SMF device, where the create session response message carries the session type information; or receiving, by the UE, an attach accept message from the common control network function CCNF device, where the attach accept message carries the session type information; or receiving, by the UE, a tracking area update response message from the CCNF device, where the tracking area update response message carries the session type information.

According to another aspect, an embodiment of this application provides a session processing method, including: receiving, by a first session management function SMF device, a request message used to request to create a first session, and sending a first create session response message. The first create session response message carries session type information. The session type information is used to indicate a type of the first session, and the session type information is used to determine whether a create session request needs to be initiated for a first service triggered by a first application. According to the solution provided in this embodiment, before the create session request is initiated, UE may determine whether to reuse a created session or create a new session. In this way, for a service that can reuse a created session, no new session needs to be created, thereby reducing signaling exchange between the UE and a network side and alleviating network load.

In a possible design, the session type information includes a data network name DNN accessed by using the first session, and the session type information further includes at least one of a type of a service supported by the first session and a type of a slice supporting the first session.

In a possible design, the first create session response message further includes an identifier of the first session.

In a possible design, the sending, by a first SMF device, a first create session response message includes: sending, by the first SMF device, the first create session response message to the UE. For example, in a non-roaming scenario, the first SMF device sends the first create session response message to the UE.

In a possible design, this application may also be applicable to a roaming scenario. If the first SMF device is an SMF device of a home public land mobile network, the sending, by a first SMF device, a first create session response message includes: sending, by the first SMF device, the first create session response message to an SMF device of a visited public land mobile network. If the first SMF device is an SMF device of a visited public land mobile network, before the sending, by a first SMF device, a first create session response message, the method further includes: receiving, by the first SMF device, a second create session response message from an SMF device of a home public land mobile network, where the second create session response message carries the DNN accessed by using the first session and the at least one of the type of the service supported by the first session and the type of the slice supporting the first session; and obtaining, by the first SMF device, the session type information based on a type of a service supported by the first SMF device and the second create session response message.

According to still another aspect, an embodiment of this application provides a session processing method, including: receiving, by a common control network function CCNF device, a request message, and sending a response message to user equipment UE after receiving the request message. The response message carries session type information. The session type information is used to indicate a type of a session supported by a slice in which the CCNF is located, and the session type information is used to determine whether a create session request needs to be initiated for a first service triggered by a first application. According to the solution provided in this embodiment, before the create session request is initiated, the UE may determine whether to reuse a created session or create a new session. In this way, for a service that can reuse a created session, no new session needs to be created, thereby reducing signaling exchange between the UE and a network side and alleviating network load.

In a possible design, the session type information includes a data network name DNN accessed by using the session, and the session type information further includes at least one of a type of a service supported by the session and a type of a slice supporting the session.

In a possible design, the request message is an initial attach request message, and the response message is an initial attach accept message; or the request message is a location area update request message, and the response message is a location area update response message.

According to yet another aspect, an embodiment of this application provides UE, and the UE has a function of implementing UE behavior in the foregoing method designs. The function may be implemented by hardware, where a structure of the UE includes a receiver and a processor. The function may alternatively be implemented by hardware executing corresponding software. The hardware or the software includes one or more modules corresponding to the function. The module may be software and/or hardware.

According to still yet another aspect, an embodiment of this application provides a CCNF device, and the CCNF device may include a receiver and a transmitter, configured to perform a communication function of the CCNF device in the foregoing aspect.

According to a further aspect, an embodiment of this application provides an SMF device, and the SMF device may include a receiver and a transmitter, configured to perform a communication function of the SMF device in the foregoing aspect.

According to a still further aspect, an embodiment of this application provides a communications system, and the system includes the CCNF device and the SMF device in the foregoing aspects.

According to a yet further aspect, an embodiment of this application provides a computer storage medium, configured to store a computer software instruction used by the foregoing UE. The computer storage medium includes a program designed to perform the foregoing aspect.

According to a still yet further aspect, an embodiment of this application provides a computer storage medium, configured to store a computer software instruction used by the foregoing CCNF device. The computer storage medium includes a program designed to perform the foregoing aspect.

According to even yet another aspect, an embodiment of this application provides a computer storage medium, configured to store a computer software instruction used by the foregoing SMF device. The computer storage medium includes a program designed to perform the foregoing aspect.

According to the technical solutions provided in the embodiments of this application, the user equipment UE obtains the session type information, where the session type information is used to indicate the type of the first session; and when the first application triggers the first service, the UE determines, based on the session type information, whether the create session request needs to be initiated for the first service. Before the create session request is initiated, the UE may determine whether to reuse a created session or create a new session. In this way, for a service that can reuse a created session, no new session needs to be created, thereby reducing signaling exchange between the UE and a network side and alleviating network load.

BRIEF DESCRIPTION OF DRAWINGS

To describe the technical solutions in the embodiments of this application more clearly, the following briefly describes the accompanying drawings required for describing the embodiments. Apparently, the accompanying drawings in the following description show merely some embodiments of the present invention, and a person of ordinary skill in the art may derive other drawings from these accompanying drawings without creative efforts.

DESCRIPTION OF EMBODIMENTS

Figure 1:
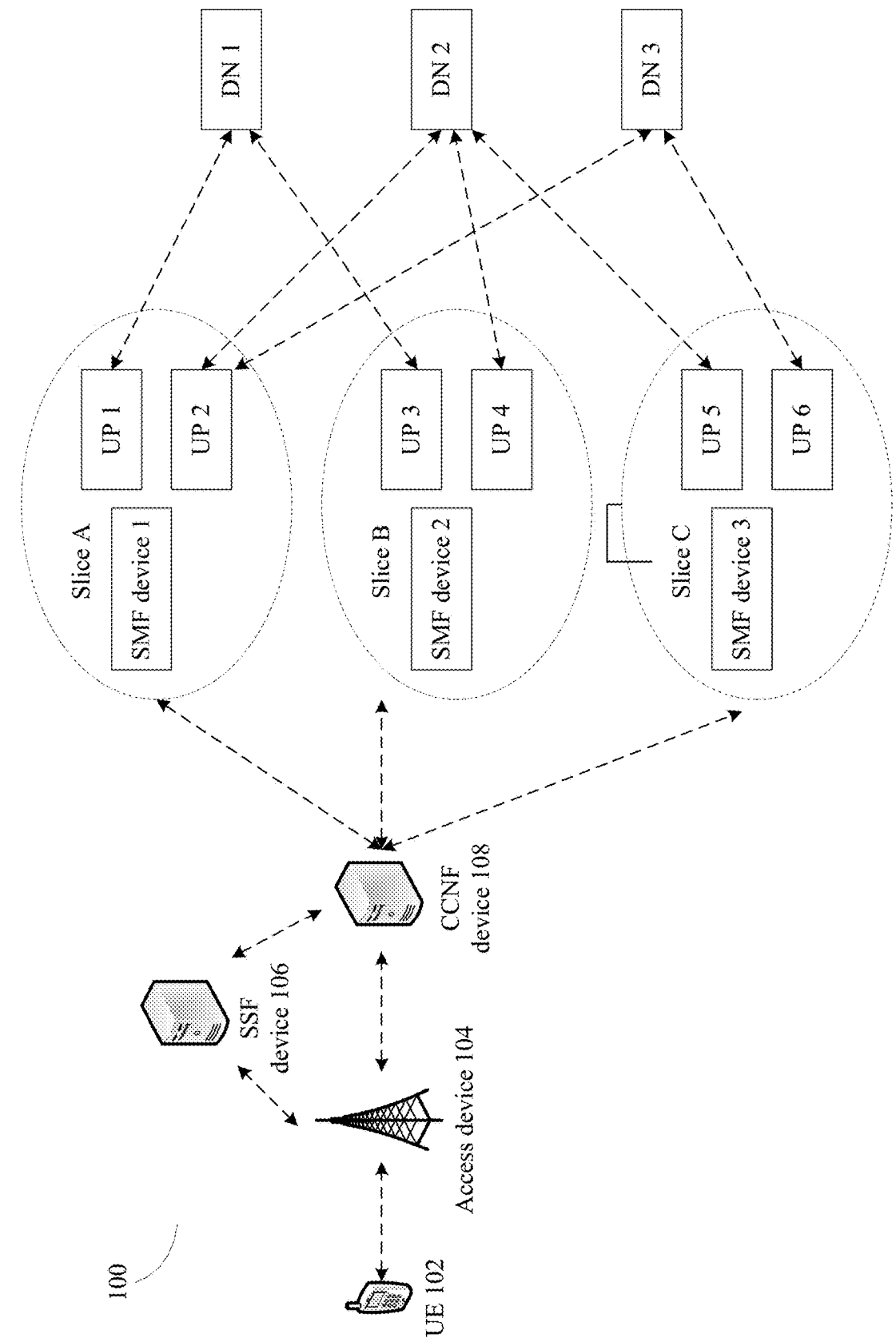
FIG. 1 is a schematic diagram of a communications system according to an embodiment of this application.

The following describes the technical solutions in the embodiments of this application with reference to the accompanying drawings in the embodiments of this application. Some terms in this application are first explained and described for ease of understanding by a person skilled in the art.

(1) User equipment (UE) in this application may include various handheld devices, in-vehicle devices, wearable devices, or computing devices having a wireless communication function, or another processing device connected to a wireless modem. The UE may also be referred to as a mobile station (MS), a terminal, or terminal equipment, and may include a subscriber unit, a cellular phone, a smartphone, a wireless data card, a personal digital assistant (PDA) computer, a tablet computer, a wireless modem, a handheld device (handheld), a laptop computer, a cordless phone, a wireless local loop (WLL) station, a machine type communication (MTC) terminal, or the like. For ease of description, the devices mentioned above are collectively referred to as UE in all the embodiments of this application.

(2) An access device in the embodiments of this application is an apparatus that is deployed on a radio access network to provide a wireless communication function for UE. The access device may include various forms of macro base stations, micro base stations (also referred to as small cells), relay stations, access points, and the like. A device having an access device function may have different names in systems that use different radio access technologies. For example, in an LTE system, the device is referred to as an evolved NodeB (eNB or eNodeB), and in a 3rd generation (3G) system, the device is referred to as a NodeB (NodeB). For ease of description, the foregoing apparatuses that provide the wireless communication function for the UE are collectively referred to as an access device in all the embodiments of this application.

(3) A network slice instance in the embodiments of this application is used to flexibly provide one or more network services based on a requirement of a slice demander. In the network slicing technology, a physical network is divided into a plurality of network slice instances, and each network slice instance performs customization and tailoring of a network function and orchestration management of the corresponding network function based on a service scenario requirement. An individual requirement of each service of a consumer or an enterprise can be better met through network customization and management, and relative independence of a plurality of services is implemented while the services share a broadband network infrastructure. The individual requirement includes requirements on a coverage area, duration, a capacity, a speed, a delay, reliability, security, availability, and the like. A "network slice" may be considered as an instantiated core network architecture. Currently, "network slice" usage instances considered in the industry include mobile broadband, multimedia, massive machine type communications, and critical machine type communication. For ease of description, the network slice instance mentioned above is briefly referred to as a slice in all the embodiments of this application.

(4) A common control network function device in the embodiments of this application is a control plane device shared by a plurality of network slice instances, and is a device responsible for mobility management, forwarding path management, and Internet Protocol (IP) address assignment in a mobile communications network. The control plane device may be but is not limited to a mobility management entity (MME), an S-GW control plane, a P-GW control plane, or the like in a core network, or may be a control plane network element integrated by any network elements in the MME, the S-GW control plane, and the P-GW control plane.

(5) A session management function (SMF) device in the embodiments of this application is a device used to manage a session in a network slice instance. The SMF device is responsible for processing a non-access signaling (NAS-Non Access Signaling) message related to UE session management. Main functions of the SMF device are UE IP address assignment, user plane function selection, and execution of a session-related policy and charging rule, and are a combination of a session management related function, an SGW control plane function, and a PGW control plane function in MME functions.

(6) A user plane (UP) device (which may also be referred to as a forwarding plane device, a user plane network element, a forwarding plane network element, a core network user plane network element, or a core network forwarding plane network element) in the embodiments of this application is a device responsible for providing service packet forwarding for terminal equipment. The user plane device may be but is not limited to a physical forwarding plane device such as an S-GW, a P-GW, a router, a switch, or a software defined network (SDN) switch, or may be a virtual forwarding plane network element such as an S-GW forwarding plane network element or a P-GW forwarding plane network element. For ease of description, the foregoing user plane devices are collectively referred to as a UP in all the embodiments of this application.

(7) A data network (DN) in the embodiments of this application is a network that UE finally needs to be connected to and access. The DN may be but is not limited to a packet data network (PDN), for example, the Internet, a virtual private network (VPN), an IP multimedia service (IMS) network, or a Wireless Application Protocol (WAP) network provided by an operator. For ease of description, the foregoing data networks are collectively referred to as a DN in all the embodiments of this application.

(8) The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

(9) In the descriptions of this application, words such as "first" and "second" are merely used for distinction and description purposes, and shall not be understood as an indication or implication of relative importance or an indication or implication of an order.

In a core network architecture that uses the network slicing technology, UE may access a single slice, or may access a plurality of slices of different types, and simultaneously use different services provided by the plurality of slices. FIG. 1 is a schematic diagram of a communications system 100 according to this application. In the communications system 100 in FIG. 1, UE 102 may simultaneously access a plurality of slices (for example, at least two of slices A, B, and C). The slices A, B, and C share a CCNF device 108, and the shared CCNF device may be a combination of a plurality of shared control plane devices. A slice selection function (a slice selection function SSF, which may also be referred to as a network slice selection function NSSF) device 106 is configured to select a slice and provide information for an access device 104, so that the access device 104 routes a packet to a corresponding CCNF device 108. In addition to the shared CCNF device 108, a slice includes an SMF device and a UP that are specific to the slice. For example, the slice A has an SMF device 1, a UP 1, and a UP 2, the slice B has an SMF device 2, a UP 3, and a UP 4, and the slice C has an SMF device 3, a UP 5, and a UP 6. The SSF device or an NSSF device may alternatively be a sub-device of the shared CCNF device. In the present invention, it is assumed that the SSF device or the NSSF device is a device independent of the CCNF device. The present invention may also be applied to a scenario in which the SSF or the NSSF device is used as a sub-device of the shared CCNF device.

When a network side receives a session request message of the UE 102, a selected SMF device selects an appropriate UP based on information carried in the session request message, such as a data network name (DNN) and a service type or a slice type, to create a session. One UP may be corresponding to one or more DNs, or one DN may create a session with a plurality of UPs. Therefore, one session may serve different DNs and different services. Therefore, when receiving a new application request message, the UE may need to create a new session, or may serve the service by using an existing session. According to the session processing method provided in this application, before a create session request is initiated, the UE may determine whether to reuse a created session or create a new session. In this way, for a service that can reuse a created session, no new session needs to be created, thereby reducing signaling exchange between the UE and the network side and alleviating network load.

In the embodiments of this application, the communications system 100 may be various radio access technology (RAT) systems, for example, a Code Division Multiple Access (CDMA) system, a Time Division Multiple Access (TDMA) system, a Frequency Division Multiple Access (FDMA) system, an orthogonal frequency division multiple access (OFDMA) system, a single carrier frequency division multiple access (SC-FDMA) system, or other systems. The terms "system" and "network" can be interchanged with each other. A radio technology such as Universal Terrestrial Radio Access (UTRA) or CDMA2000 may be implemented in the CDMA system. UTRA may include a Wideband CDMA (WCDMA) technology and another technology transformed from CDMA. CDMA2000 may cover Interim Standard (IS) 2000 (IS-2000), IS-95, and IS-856. A radio technology such as a Global System for Mobile Communications (GSM) may be implemented in the TDMA system. Radio technologies such as evolved universal terrestrial radio access (E-UTRA), Ultra Mobile Broadband (UMB), IEEE 802.11 (Wi-Fi), IEEE 802.16 (WiMAX), IEEE 802.20, and Flash OFDMA may be implemented in the OFDMA system. UTRA is corresponding to UMTS, and E-UTRA is corresponding to an evolved version of UMTS. The 3GPP uses a new version of UMTS, namely, E-UTRA, in Long Term Evolution (LTE) and various versions evolved based on LTE. In addition, the communications system 100 may be further applied to a future-oriented communications technology such as a 4.5G system or an NR (New Radio) system. The system architecture and the service scenario described in the embodiments of this application are intended to describe the technical solutions in the embodiments of this application more clearly, and do not constitute a limitation on the technical solutions provided in the embodiments of this application. A person of ordinary skill in the art can understand that, as the network architecture evolves and a new service scenario appears, the technical solutions provided in the embodiments of this application are also applicable to a similar technical problem.

Figure 2:
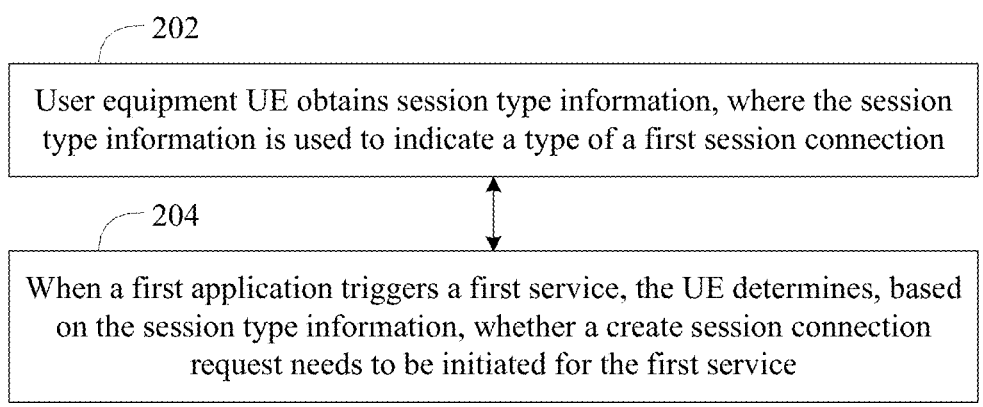
FIG. 2 is a schematic flowchart of a session processing method according to an embodiment of this application.

FIG. 2 is a flowchart of a session processing method according to an embodiment of this application. As shown in FIG. 2, the method includes the following steps.

In step 202, UE obtains session type information, where the session type information is used to indicate a type of a first session.

For example, the session type information includes a data network name DNN supported by the first session, and the session type information further includes at least one of a type of a service supported by the first session and a type of a slice supporting the first session. For example, the first session may support a plurality of services. An example in which the session type information includes the DNN and the type of the service supported by the first session is used for description. When the session type information includes the DNN and the type of the slice supporting the first session, the session type information may have a similar format, and this is not limited in the present invention.

Optionally, the UE may obtain the session type information in a create session procedure, where the first session is a session created by using the create session procedure. Alternatively, the UE may obtain the session type information in an initial attach procedure or a tracking area update (TAU) procedure, where the session type information includes a type of a session supported by a slice in which a UE-attached-to CCNF device is located, and the session supported by the slice in which the UE-attached-to CCNF device is located includes the first session. How the UE obtains the session type information is further described with reference to FIG. 3A to FIG. 3D.

After creating the first session, the UE stores session information of the session, as shown in Table 1:

TABLE 1

| Session identifier 1 | Service type 1 | DNN 1 |
| Session identifier 2 | Service type 2 | DNN 2 |
| Session identifier 3 | Service type 3 | DNN 1 |
| ... | ... | ... |

Using the communications system in FIG. 1 as an example, the UE may access a DN 1 by using a slice A to obtain a service of the service type 1, may access a DN 2 by using a slice A to obtain a service of the service type 2, or may access a DN 3 by using a slice A to obtain a service of the service type 2. In addition, the UE may access the DN 1 by using a slice B to obtain a service of the service type 3, or may access the DN 2 by using a slice B to obtain a service of the service type 4.

Table 1 stores three sessions created by the UE, and a service type and a DNN for triggering creation of each session.

Optionally, the method further includes: obtaining, by the UE, an identifier of the first session. The identifier of the first session may be used for the first session. For example, the session type information further includes the identifier of the first session. Alternatively, a message used to transfer the session type information (for example, a create session response message in FIG. 3A/3D) further carries an information element used to indicate the identifier of the first session. When the session type information further includes the identifier of the first session, the session type information may have a format in Table 2:

TABLE 2

| Session identifier 1 | Service type 1 | DNN 1 |
| Session identifier 2 | Service type 2 | DNN 2 |
|                      | Service type 2 | DNN 3 |
| Session identifier 3 | Service type 3 | DNN 1 |
| Session identifier 4 | Service type 4 | DNN 2 |

Optionally, as shown in Table 3 and Table 3', the session type information may further include an identifier of the UE-attached-to CCNF device or a slice identifier (NS-ID). As shown in Table 3, when the session type information includes the identifier of the CCNF device, the session type information may be used to indicate the type of the session supported by the slice in which the CCNF device is located. As shown in Table 3', when the session type information includes the slice identifier, the session type information may be used to indicate a type of a session supported by a specific slice controlled by the CCNF device. Slices in which the UE-attached-to CCNF device is located include slices 1, 2, and 3, and corresponding slice identifiers are respectively an NS-ID 1, an NS-ID 2, and an NS-ID 3.

TABLE 3

| CCNF 1 | Session type 1 | Service type 1 | DNN 1 |
|        | Session type 2 | Service type 2 | DNN 2 |
|        |                | Service type 2 | DNN 3 |
|        | Session type 3 | Service type 3 | DNN 3 |
|        | Session type 4 | Service type 4 | DNN 1 |
|        | . . .          | . . .          | . . . |

TABLE 3'

| NS-ID 1 | Session type 1 | Service type 1 | DNN 1 |
|         | Session type 2 | Service type 2 | DNN 2 |
|         |                | Service type 2 | DNN 3 |
| NS-ID 2 | Session type 3 | Service type 3 | DNN 1 |
|         | Session type 4 | Service type 4 | DNN 2 |
| NS-ID 3 | . . .          | . . .          | . . . |

In step 204, when a first application triggers a first service, the UE determines, based on the session type information, whether a create session request needs to be initiated for the first service.

For example, different applications are corresponding to different DNNs and different service types. A correspondence between the first application and a data network name DNN accessed by the first application and between the first application and a type of the first service or a type of a slice required for supporting the first service may be preconfigured in the UE. For example, the correspondence preconfigured in the UE is shown in Table 4:

TABLE 4

| Application 1 | Service type 1 | DNN 1 |
| Application 2 | Service type 2 | DNN 2 |
| Application 3 | Service type 3 | DNN 2 |

For example, for a call application, a service type of the call application is Voice over Internet Protocol (VoIP), and a DNN of the call application is an operator network name. For a WeChat application, a service type of the WeChat application is MBB, and a DNN of the WeChat application is a domain name of Tencent. For an intra-enterprise communication application, a service type of the intra-enterprise communication application is intra-enterprise MBB, and a DNN of the intra-enterprise communication application is an intranet domain name. For a self-driving application, a service type of the self-driving application is vehicle-to-everything (V2X), and a DNN of the self-driving application may be a network domain name of BMW. Therefore, the correspondence preconfigured in the UE may have a format in Table 5:

TABLE 5

| Application | Service type | DNN |
|---|---|---|
| Call application | VoIP | Operator network name |
| WeChat application | MBB | Domain name of Tencent |
| Intra-enterprise communication application | Intra-enterprise MBB | Intranet domain name |
| Self-driving application | V2X | Network domain name of BMW |

The UE may determine, based on the preconfigured correspondence and the session type information, whether there is a created session that supports the type of the first service and the DNN accessed by the first application. If there is a created session that can support the type of the first service and the DNN accessed by the first application, the existing session is reused by the first application to access the DNN; or if there is no created session that can support the type of the first service and the DNN accessed by the first application, the UE needs to initiate the create session request for the first service.

For example, when the application 1 in Table 4 triggers a service of the service type 1, the UE determines, based on the session type information in Table 1 (or Table 2 or Table 3) and the preconfigured correspondence in Table 4, that an existing session may be used by the application 1 to access the DNN1, and a new create session request does not need to be initiated.

Therefore, according to the solution provided in this embodiment, before the create session request is initiated, the UE may determine, based on the session type information, whether to reuse a created session or create a new session. In this way, for a service that can reuse a created session, no new session needs to be created, thereby reducing signaling exchange between the UE and a network side and alleviating network load.

The following uses four embodiments in FIG. 3A to FIG. 3D to describe a manner of obtaining session type information by user equipment. FIG. 3A to FIG. 3D are described with reference to FIG. 1 and FIG. 2.

Figure 3A:
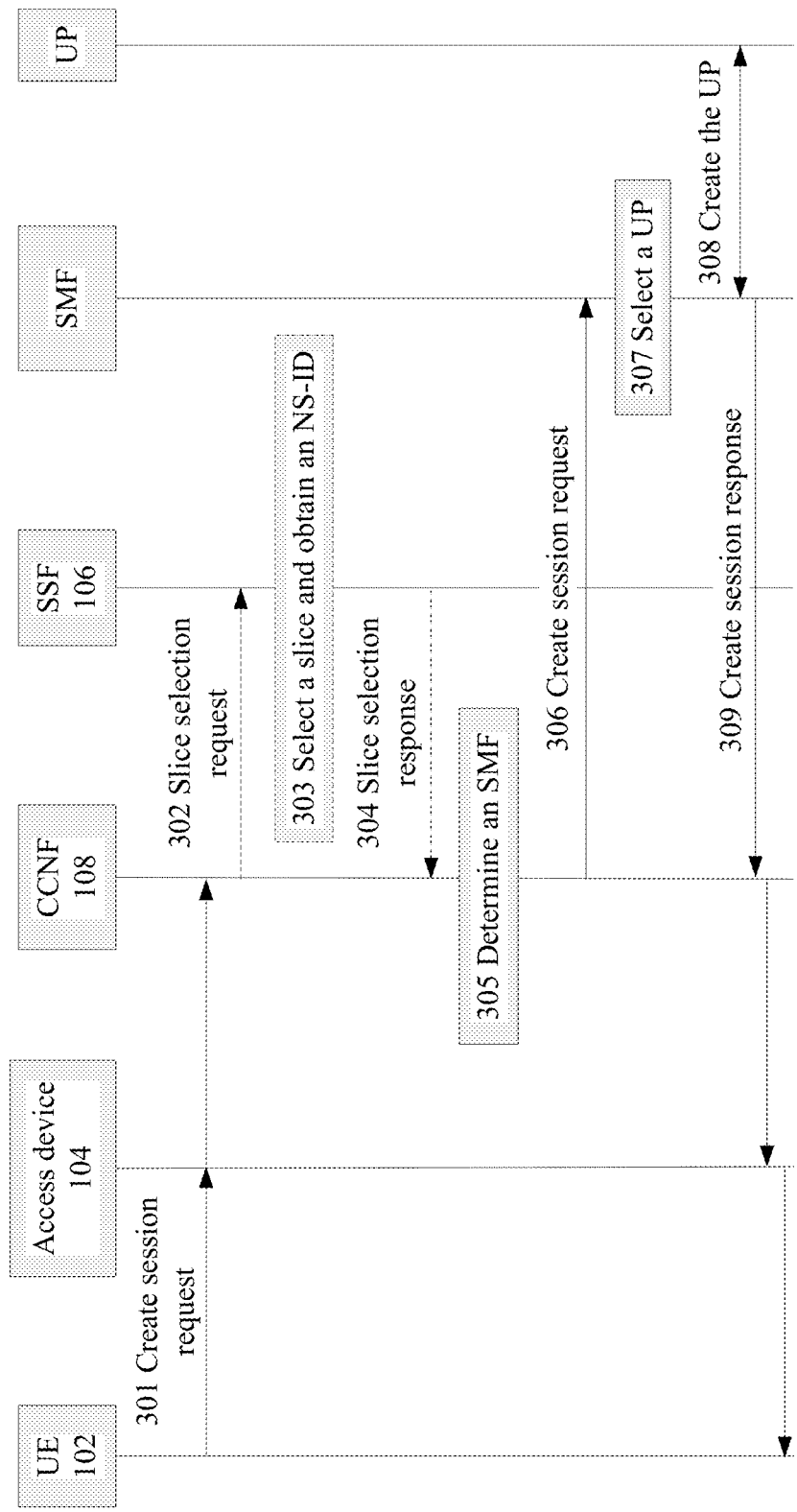
FIG. 3A to FIG. 3D are a schematic interaction diagram of a session processing method according to an embodiment of this application.

For example, the UE may obtain the session type information in a create session procedure, and the create session procedure is used to create a first session. As shown in FIG. 3A, the method includes the following steps.

In step 301, UE 102 sends a create session request message to an access device 104, and the access device 104 forwards the create session request message to a CCNF device 108 after receiving the create session request message. The create session request message carries a network slice, SMF selection assistance Information (SM Network Slice Selection Assistance Information, SM NSSAI), and a DNN to be accessed by a service that requests the session.

For example, the SM NSSAI is at least one of a type of a service requested by the UE 102 or a type of a slice that provides the service.

In step 302, the CCNF device 108 sends, to an SSF device 106 based on the received create session request message, a slice selection request message that carries SM NSSAI.

In step 303, after receiving the slice selection request message, the SSF device 106 selects a slice based on the SM NSSAI, and obtains an identifier of the slice, for example, an NS-ID.

In step 304, the SSF device 106 sends, to the CCNF device 108, a slice selection response message that carries the NS-ID.

Step 302 to step 304 are optional steps. If the CCNF has obtained a correspondence between the NSSAI and the identifier of the slice through pre-configuration or the like, step 302 and step 304 do not need to be performed.

In step 305, the CCNF device 108 determines an SMF device (for example, the SMF device 1 in FIG. 1).

In step 306, the CCNF device 108 sends the create session request message to the determined SMF device, where the create session request message carries a DNN that the UE 102 wants to access by using the to-be-created first session.

In step 307, after receiving the create session request message, the SMF device selects a user plane UP based on the DNN.

In step 308, the UP is created. For example, a user plane on a home public land mobile network (HPLMN) side is created in a non-roaming scenario.

In step 309, the SMF device obtains session type information, and sends, to the UE 102, a create session response message that carries the session type information. The session type information includes at least a DNN supported by the first session, and further includes at least one of a type of a service supported by the first session and a type of a slice supporting the first session. The SMF device sends the create session response message to the CCNF device 108, the CCNF device 108 forwards the create session response message to the access device 104 after receiving the create session response message, and the access device 104 forwards the create session response message to the UE 102 after receiving the create session response message.

After receiving the create session response message, the UE 102 may obtain the session type information from the create session response message and store the session type information, where the session type information is, for example, in a form of Table 2. Therefore, after the UE obtains the session type information in the create session procedure, when a new first application triggers a first service, before initiating the create session request, the UE may determine, based on the session type information, whether to reuse a created session or create a new session. In this way, for a service that can reuse a created session, no new session needs to be created, thereby reducing signaling exchange between the UE and a network side and alleviating network load.

For example, in this embodiment, Table 2 and Table 4 are stored on the UE side.

With reference to Table 2, by using the communications system in FIG. 1 as an example, it is assumed that in this case, Table 2 includes only information about a session identifier 1, that is, the network side creates, by using the process described in step 301 to step 309, a session whose session identifier is "session identifier 1", and the UE obtains type information of the session whose session identifier is "session identifier 1".

A new application "application 2" of the UE initiates a service request. The UE determines, based on preconfigured information in Table 4, that the application requests to access a DNN 2 to obtain a service A of a service type 2. In this case, the UE queries a service type information list. In this case, Table 2 includes only the information about the session identifier 1, and the UE finds that an existing created session cannot match a requirement of "application 2". Therefore, the UE sends a new create session request to the network side, the network side creates a session whose session identifier is "session identifier 2" according to the create session request sent by the UE, and adds session type information of "session identifier 2", namely, a second row and a third row in Table 2 to a create session response message to be returned to the UE.

When a new application "application 3" of the UE initiates a service request, the UE determines, based on the preconfigured information in Table 4, that the application requests to access a DNN 3 to obtain a service B of a service type 2. In this case, the UE queries a service type information list to find that a session of "session identifier 2" can support the service requested by the application, the UE determines that the service A and the service B can share a same IP, and the UE directly sends and receives a data packet of the service B by using the session whose session identifier is "session identifier 2". Specifically, the UE may further determine a requirement of a service on an IP address based on a "session and service continuity (SSC) mode" supported by the service.

Figure 3B:
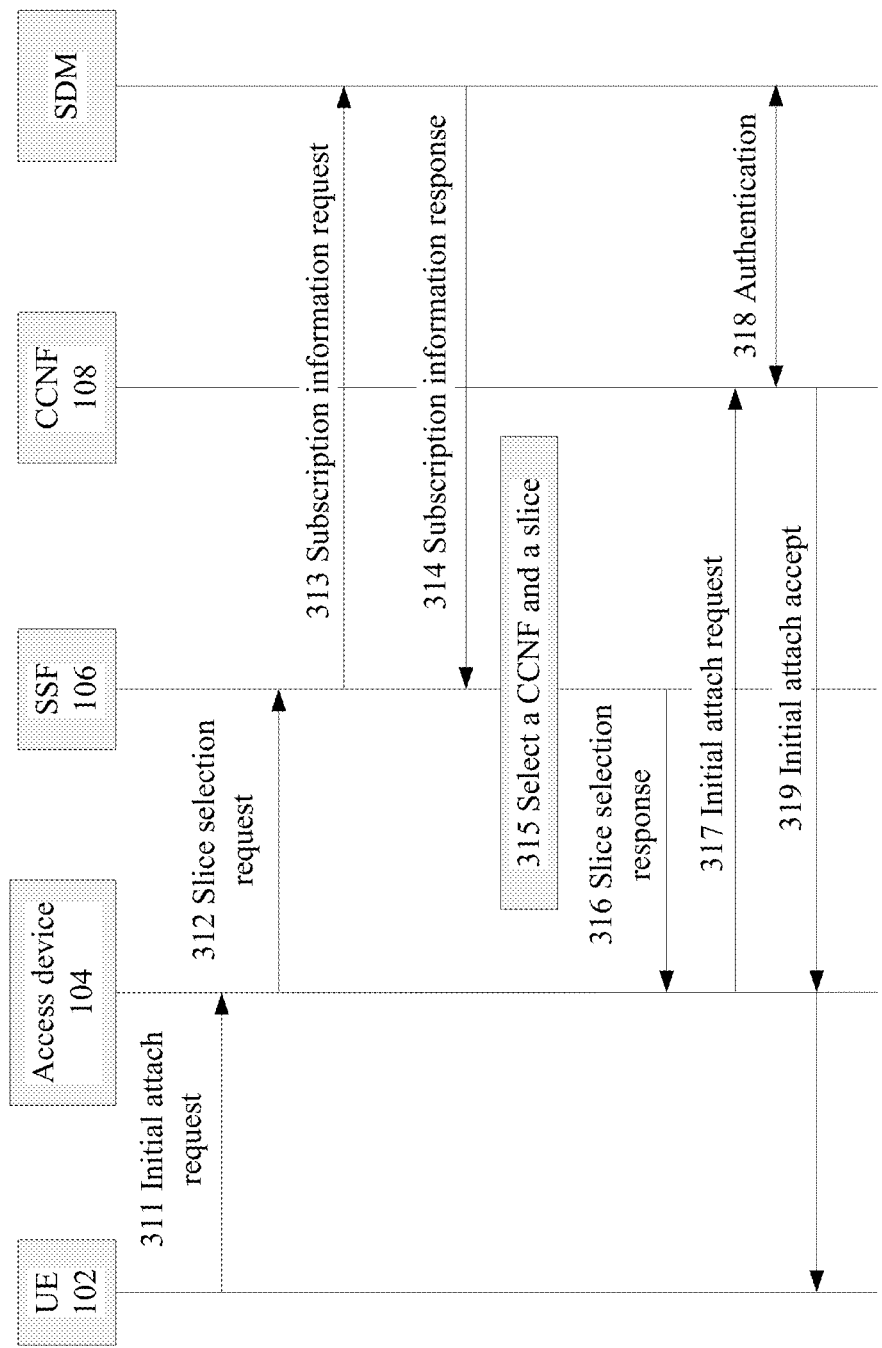

Alternatively, UE may obtain session type information in an initial attach procedure. As shown in FIG. 3B, the method includes the following steps.

In step 311, UE 102 initiates an initial attach request message to an access device 104 to request to access a network. The initial attach request message includes an international mobile subscriber identity (IMSI) used to indicate the UE 102.

In step 312, after receiving the initial attach request message, the access device 104 sends, to an SSF device 106, a slice selection request message that carries the IMSI, where the slice selection request message is used to request the SSF device 106 to select a CCNF device (for example, a CCNF device 108) for the UE 102.

In step 313, after receiving the slice selection request message, the SSF device 106 sends, to a subscriber data management (SDM) device, a subscription information request message that carries the IMSI, where the subscription information request message is used to request subscription information of the UE 102.

In step 314, after receiving the subscription information request message, the SDM device obtains subscribed NSSAI of the UE based on the IMSI. The subscribed NSSAI includes one or a group of service types or slice types that need to be provided by the network and that are subscribed by the UE 102. Optionally, the subscribed NSSAI further includes a DNN supported by one or a group of subscribed service types or slice types that need to be provided by the network.

In step 315, the SSF device 106 selects the CCNF device (for example, the CCNF device 108) based on the subscribed NSSAI.

In step 316, the SSF device sends, to the access device 104, a slice selection response message that carries information that can identify the CCNF, where the slice selection response message further includes network-accepted NSSAI (Accepted NSSAI).

In step 317, after receiving the slice selection response message, the access device 104 sends the initial attach request message to the CCNF device 108. For example, the initial attach request message may carry the foregoing IMSI.

In step 318, after receiving the initial attach request message, the CCNF device 108 interacts with the SDM device to implement authentication on the UE.

In step 319, after the authentication is completed, the CCNF device 108 sends, to the UE 102, an initial attach accept message that carries the session type information. The session type information includes one or a group of session types supported by a slice in which the CCNF is located, and the session type information includes at least a DNN supported by the first session and further includes at least one of a type of a service supported by the first session and a type of a slice supporting the first session. Optionally, the session type information further includes an identifier of the CCNF device or an identifier of a slice supported by the CCNF. The CCNF device 108 sends the initial attach accept message to the access device 104, and the access device 104 forwards the initial attach accept message to the UE 102 after receiving the initial attach accept message.

After receiving the initial attach accept message, the UE 102 may obtain the session type information from the initial attach accept message and store the session type information, where the session type information is, for example, in a form of Table 3. Therefore, after the UE obtains the session type information in the initial attach procedure, when a new first application triggers a first service, before initiating a create session request, the UE may determine, based on the session type information, whether to reuse a created session or create a new session. In this way, for a service that can reuse a created session, no new session needs to be created, thereby reducing signaling exchange between the UE and a network side and alleviating network load.

For example, in this embodiment, Table 1, Table 3 or Table 3', and Table 4 are stored on the UE side.

With reference to Table 3, by using the communications system in FIG. 1 as an example, the CCNF device 108 sends, to the UE 102, the initial attach accept message that carries the session type information, where the session type information includes a list of session types supported by all slices in which the CCNF device 108 is located, for example, "session type 1" supports a service type 1 and a DNN 1 can be accessed; and "session type 2" supports a service type 2 and a DNN 2 and a DNN 3 can be accessed.

It is assumed that the UE and the network side have created a session for "application 2" (it is required to access the DNN 2 to obtain the service type 2), and the UE side stores information about the created session. Referring to Table 1, in other words, the UE has stored a second piece of information in Table 1.

When a new application "application 3" of the UE initiates a service request, the UE determines, based on preconfigured information in Table 4, that the application requests to access the DNN 3 to obtain a service B of the service type 2. In this case, the UE queries a service type information list, namely, Table 3, to find that "session type 2" can support both "service type 2+DNN 2" and "service type 2+DNN 3". In addition, the UE queries Table 1 to find that there is a session that supports "service type 2+DNN 2". With reference to Table 1 and Table 3, the UE finds that a session of "session identifier 2" can support the service requested by the application, the UE determines that a service 2 and a service 1 may share a same IP address, and the UE directly sends and receives a data packet of the service by using the session whose session identifier is "session identifier 2".

Specifically, the UE may further determine a requirement of a service on an IP address based on a "session and service continuity (SSC) mode" supported by the service.

Figure 3C:
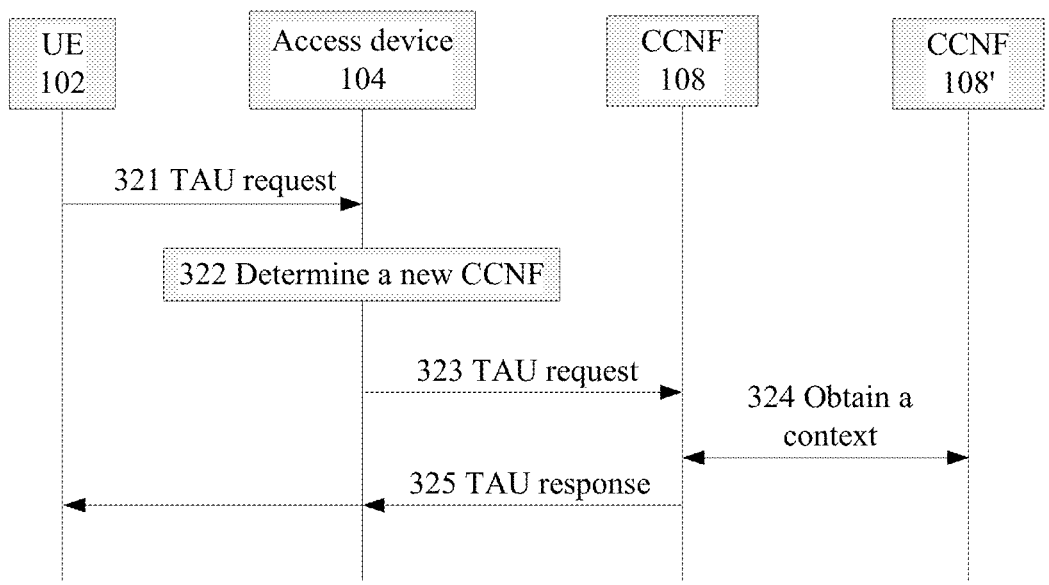

Alternatively, UE may obtain session type information in a TAU procedure. In an example in FIG. 3C, an original CCNF device before a location area is updated is a CCNF device 108', and a new CCNF device after the location area is updated is a CCNF device 108. As shown in FIG. 3C, the method includes the following steps.

In step 321, UE 102 initiates a TAU request message to an access device 104 to request to perform a tracking area update. For example, the TAU request message includes a temporary identifier (temp ID) used to indicate the UE 102 and network-accepted NSSAI (Accepted NSSAI), and the accepted NSSAI is used by the access device 104 to determine a new CCNF device.

In step 322, after receiving the TAU request message, the access device 104 determines the new CCNF device based on the accepted NSSAI information.

In step 323, the access device 104 forwards the TAU request message to the new CCNF device 108.

In step 324, after receiving the TAU request message, the new CCNF device 108 obtains a context of the UE 102 from the original CCNF device 108'.

In step 325, the CCNF device 108 sends, to the UE 102, a TAU response message that carries session type information. The session type information includes one or a group of session types supported by a slice in which the CCNF is located, and the session type information includes at least a DNN supported by a first session and further includes at least one of a type of a service supported by the first session and a type of a slice supporting the first session. Optionally, the session type information further includes an identifier of the CCNF device or an identifier of a slice supported by the CCNF. For example, the CCNF device 108 sends the TAU response message to the access device 104, and the access device 104 forwards the TAU response message to the UE 102 after receiving the TAU response message.

After receiving the TAU response message, the UE 102 may obtain the session type information from the TAU response message and store the session type information, where the session type information is, for example, in a form of Table 3 or Table 3'. Therefore, after the UE obtains the session type information in the TAU procedure, when a new first application triggers a first service, before initiating a create session request, the UE may determine, based on the session type information, whether to reuse a created session or create a new session. In this way, for a service that can reuse a created session, no new session needs to be created, thereby reducing signaling exchange between the UE and a network side and alleviating network load.

Figure 3D:
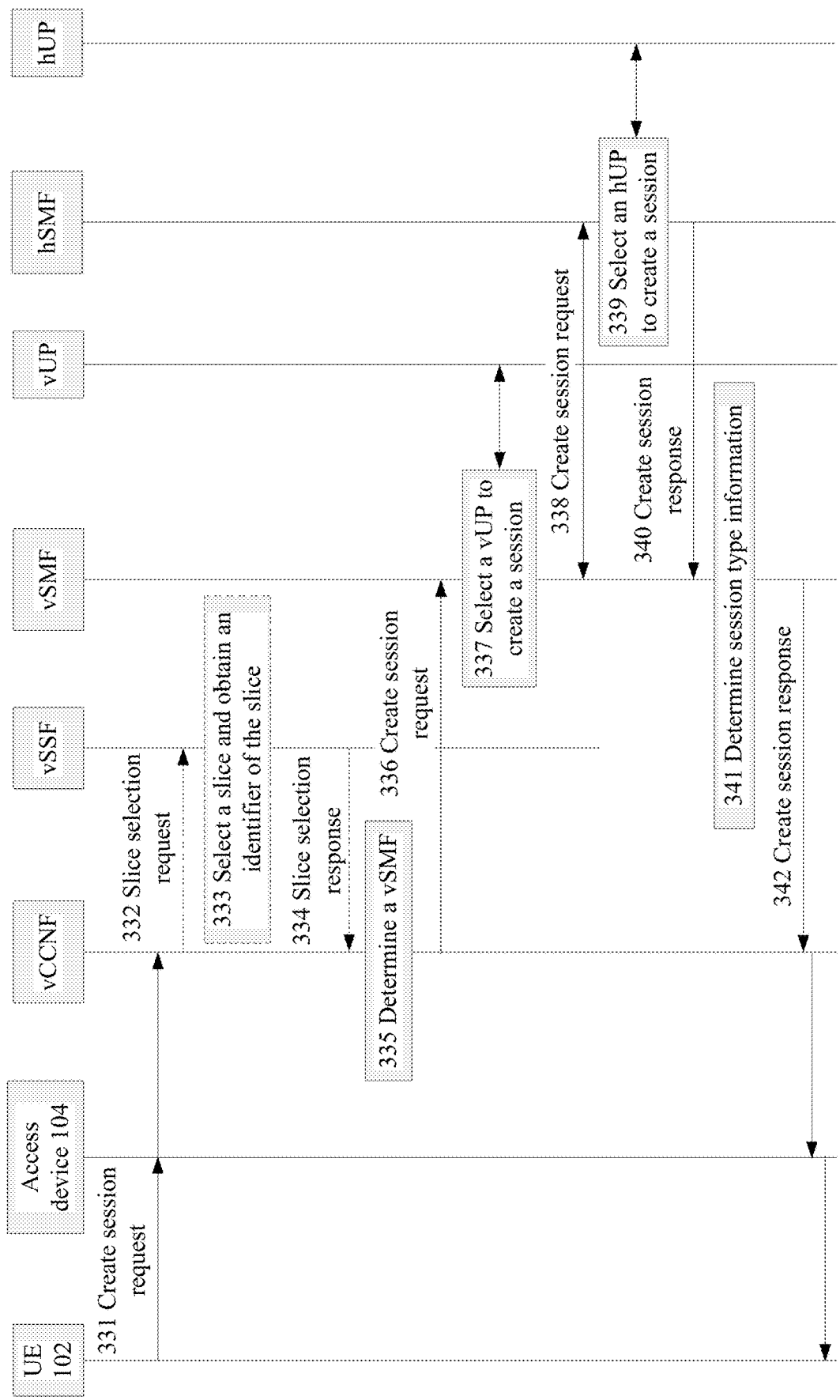

Optionally, an example of FIG. 3A may be applicable to a create session procedure in a non-roaming scenario. When UE 102 is in a roaming scenario, session type information may be obtained from a create session procedure by using the method in FIG. 3D. The create session procedure is used to create a first session. In an example of FIG. 3D, a visited public land mobile network (vPLMN) includes a visited CCNF device (vCCNF), a visited SSF device (vSSF), a visited SMF device (vSMF), and a visited user plane (vUP). A home PLMN (hPLMN) includes a home SMF device (hSMF) and a home user plane (hUP). As shown in FIG. 3D, the method includes the following steps.

In step 331, the UE 102 sends a create session request message to an access device 104, and the access device 104 forwards the create session request message to the vCCNF after receiving the create session request message. The create session request message carries a network slice, SMF selection assistance information (SM NSSAI), and a DNN to be accessed by a service that requests the session. For example, the SM NSSAI is at least one of a type of a service requested by the UE 102 or a type of a slice that provides the service. For example, the SM NSSAI is at least one of a type of a service requested by the UE 102 or a type of a slice that provides the service.

In step 332, the vCCNF sends, to the vSSF device based on the received create session request message, a slice selection request message that carries the SM NSSAI.

In step 333, the vSSF selects a slice based on the NSSAI, and obtains an identifier of the slice. For example, the identifier of the slice includes a slice identifier vNS-ID of the vPLMN and a slice identifier hNS-ID of the hPLMN. For example, the vSSF may obtain, from an SSF of the vPLMN, the identifier hNS-ID of the hPLMN slice selected by the hPLMN.

In step 334, the vSSF sends, to the vCCNF, a slice selection response message that carries a slice identifier.

In step 335, the vCCNF determines the vSMF based on the vNS-ID.

In step 336, the vCCNF sends the create session request message to the determined vSMF. For example, the create session request message carries the hNS-ID and a DNN that the UE 102 wants to access by using the to-be-created first session. The create session request message is used to request to create a session between the vSMF and the vUP.

In step 337, after receiving the create session request message, the vSMF selects the vUP based on the DNN and the hNS-ID, and creates a vPLMN-side session (for example, the first session) between the vSMF and the vUP.

For step 331 to step 337, refer to the descriptions of step 301 to step 308 in FIG. 3A. Details are not described herein again.

In step 338, the vSMF sends the create session request message to the hSMF, where the create session request message carries the DNN that is to be accessed by using the session requested by the UE.

In step 339, after receiving the create session request message, the hSMF selects the hUP based on the DNN, and creates an hPLMN-side session between the hSMF and the hUP.

In step 340, the hSMF obtains at least one of a type of a service supported by the hPLMN-side session and a type of a slice supporting the hPLMN-side session, and sends the foregoing session type information to the vSMF by using a create session response message. In addition, the create session response message in step 340 may further include the DNN. For example, type information of the hPLMN-side session included in the create session response message may have a format in Table 2.

In step 341, the vSMF determines final session type information based on the received type information of the hPLMN-side session and type information of a service supported by the vPLMN-side session.

For example, the type information of the hPLMN-side session may have a format in Table 2, and the type information of the service supported by the vPLMN-side session is shown in Table 6. A session identifier 1 is an identifier of the vPLMN-side session, and the session supports a service type 1 and a service type 4. Therefore, it can be learned from information in Table 2 and Table 6 that the service type 1 supported on the hPLMN side can also be supported on the vPLMN side, and the final service type information that is determined by the vSMF and that is supported by the created session may be shown in Table 7.

TABLE 6

| Session identifier 1 | Service type 1 |
| | Service type 4 |

TABLE 7

| Session identifier 1 | Service type 1 | DNN1 |

In step 342, the vSMF sends, to the UE 102, the create session response message that carries the session type information. The session type information includes at least a DNN supported by the first session (the vPLMN-side session), and further includes at least one of a type of a service supported by the first session and a type of a slice supporting the first session. For example, the vSMF sends the create session response message to the vCCNF, the vCCNF forwards the create session response message to the access device 104 after receiving the create session response message, and the access device 104 forwards the create session response message to the UE 102 after receiving the create session response message.

After receiving the create session response message, the UE 102 may obtain the session type information from the create session response message and store the session type information, where the session type information is, for example, in a form of Table 7. Therefore, after the UE obtains the session type information in the create session procedure, when a new first application triggers a first service, before initiating the create session request, the UE may determine, based on the session type information, whether to reuse a created session or create a new session. In this way, for a service that can reuse a created session, no new session needs to be created, thereby reducing signaling exchange between the UE and a network side and alleviating network load.

Figure 4:
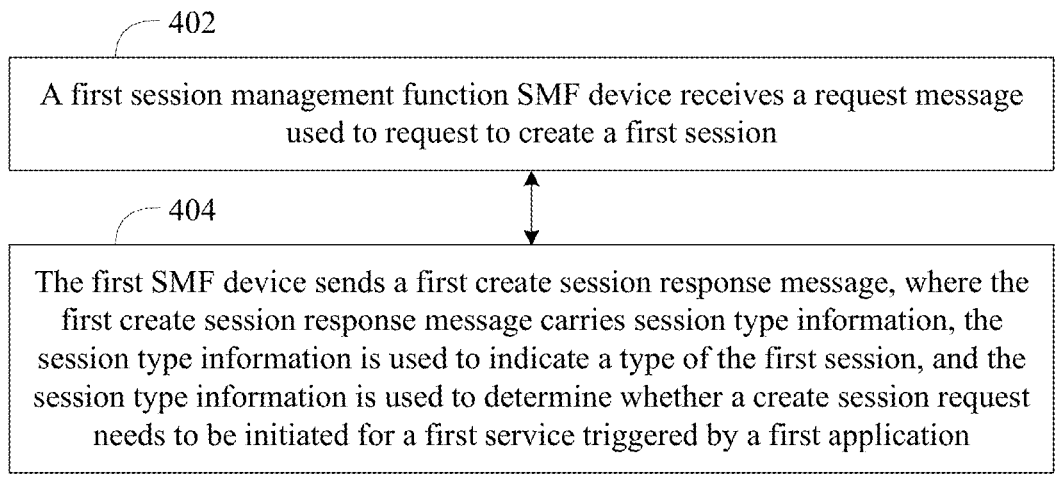
FIG. 4 is another schematic flowchart of a session processing method according to an embodiment of this application.

FIG. 4 is a schematic flowchart of a session processing method according to an embodiment of this application. The method may be performed by the SMF device in FIG. 3A, or may be performed by the vSMF device or the hSMF device in FIG. 3D. As shown in FIG. 4, the method includes the following steps.

In step 402, a first SMF device receives a request message used to request to create a first session.

In step 404, the first SMF device sends a first create session response message, where the first create session response message carries session type information, the session type information is used to indicate a type of the first session, and the session type information is used to determine whether a create session request needs to be initiated for a first service triggered by a first application.

For detailed descriptions of the session type information, refer to the descriptions of FIG. 2. Details are not described herein again.

For example, in a non-roaming scenario in FIG. 3A, step 404 includes: the first SMF device sends the first create session response message to an SMF device of a visited public land mobile network.

For example, in a roaming scenario in FIG. 3D, the first SMF device may be a vSMF device or an hSMF device. If the first SMF device is an hSMF device, step 404 includes: sending the first create session response message to a vSMF device. If the first SMF device is a vSMF device, before step 404, the method further includes: the first SMF device receives a second create session response message from an hSMF device, and obtains the session type information based on a type of a service supported by the first SMF device and the second create session response message. For this step, refer to step 341 and step 342 in FIG. 3D. Details are not described herein again.

Figure 5:
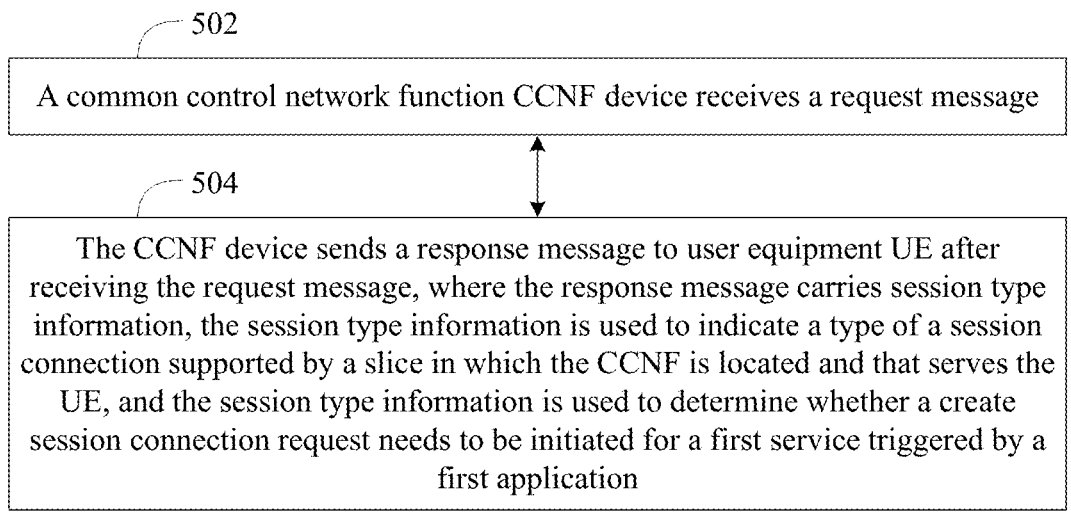
FIG. 5 is still another schematic flowchart of a session processing method according to an embodiment of this application.

FIG. 5 is a schematic flowchart of a session processing method according to an embodiment of this application. The method may be performed by the CCNF device in FIG. 3B or FIG. 3C. As shown in FIG. 5, the method includes the following steps.

In step 502, the CCNF device receives a request message.

In step 504, the CCNF device sends a response message to user equipment UE after receiving the request message, where the response message carries session type information, the session type information is used to indicate a type of a session supported by a slice in which the CCNF is located, and the session type information is used to determine whether a create session request needs to be initiated for a first service triggered by a first application.

For detailed descriptions of the session type information, refer to the descriptions of FIG. 2. Details are not described herein again.

For example, the request message is an initial attach request message, and the response message is an initial attach accept message. For details, refer to the descriptions of step 317 and step 319 in FIG. 3B. Details are not described herein again. Alternatively, the request message is a location area update request message, and the response message is a location area update response message. For details, refer to the descriptions of step 323 and step 325 in FIG. 3C. Details are not described herein again.

In the foregoing embodiments provided in this application, the session processing method provided in the embodiments of this application is described separately from a perspective of each network element and from a perspective of interaction between network elements. It may be understood that, to implement the foregoing functions, the network elements, such as the UE, the SMF device, and the CCNF device, include a corresponding hardware structure and/or software module for performing each function. A person skilled in the art should easily be aware that, in combination with units and algorithm steps in the examples described in the embodiments disclosed in this specification, the embodiments of this application can be implemented by using hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 6:
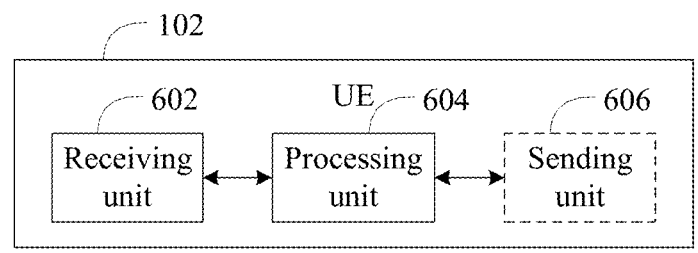
FIG. 6 is a schematic structural diagram of UE according to an embodiment of this application.

For example, when the foregoing network element implements a corresponding function by using a software module, as shown in FIG. 6, the UE 102 may include a receiving unit 602 and a processing unit 604. The receiving unit 602 may be configured to perform step 202 in FIG. 2, step 309 in FIG. 3A, step 319 in FIG. 3B, step 325 in FIG. 3C, or step 342 in FIG. 3D. The processing unit 604 may be configured to perform step 204 in FIG. 2. In addition, the UE 102 may further include a sending unit 606, configured to send various messages to another network element, for example, perform step 301 in FIG. 3A, step 311 in FIG. 3B, step 321 in FIG. 3C, or step 331 in FIG. 3D.

Figure 7:
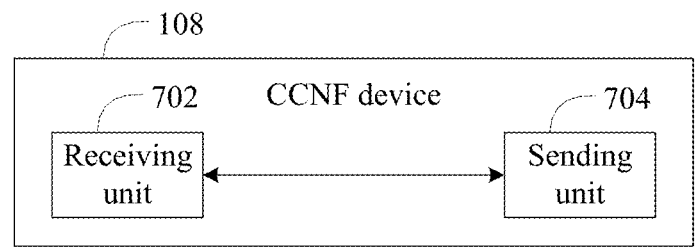
FIG. 7 is a schematic structural diagram of a CCNF device according to an embodiment of this application.

As shown in FIG. 7, the CCNF device 108 may include a receiving unit 702 and a sending unit 704. The receiving unit 702 is configured to receive a request message (refer to step 502). The sending unit 704 is configured to send, to UE, a response message that carries session type information (refer to step 504). For example, the receiving unit 702 may be configured to perform step 301, step 304, and step 309 in FIG. 3A, step 317 in FIG. 3B, step 323 in FIG. 3C, or step 331 and step 334 in FIG. 3D. The sending unit 704 may be configured to perform step 302, step 306, step 309, and step 342 in FIG. 3A, step 319 in FIG. 3B, step 325 in FIG. 3C, or step 332, step 336, and step 342 in FIG. 3D.

Figure 8:
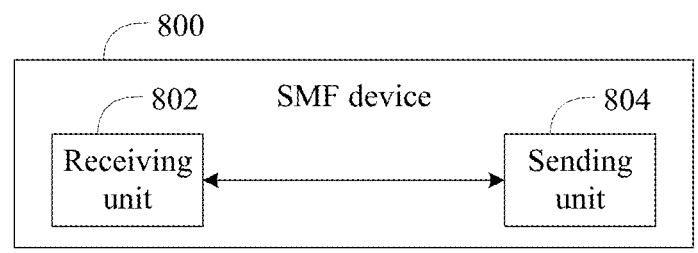
FIG. 8 is a schematic structural diagram of an SMF device according to an embodiment of this application.

As shown in FIG. 8, the SMF device 800 may include a receiving unit 802 and a sending unit 804. The receiving unit 802 is configured to receive a request message used to request to create a first session (refer to step 402). The sending unit 804 is configured to send a first create session response message that carries session type information (refer to step 404). For example, the receiving unit 802 may be configured to perform step 306 in FIG. 3A, step 312 and step 314 in FIG. 3B, or step 336 and step 340 in FIG. 3D. The sending unit 804 may be configured to perform step 309 in FIG. 3A, step 313 and step 316 in FIG. 3B, or step 342 in FIG. 3D.

Figure 9:
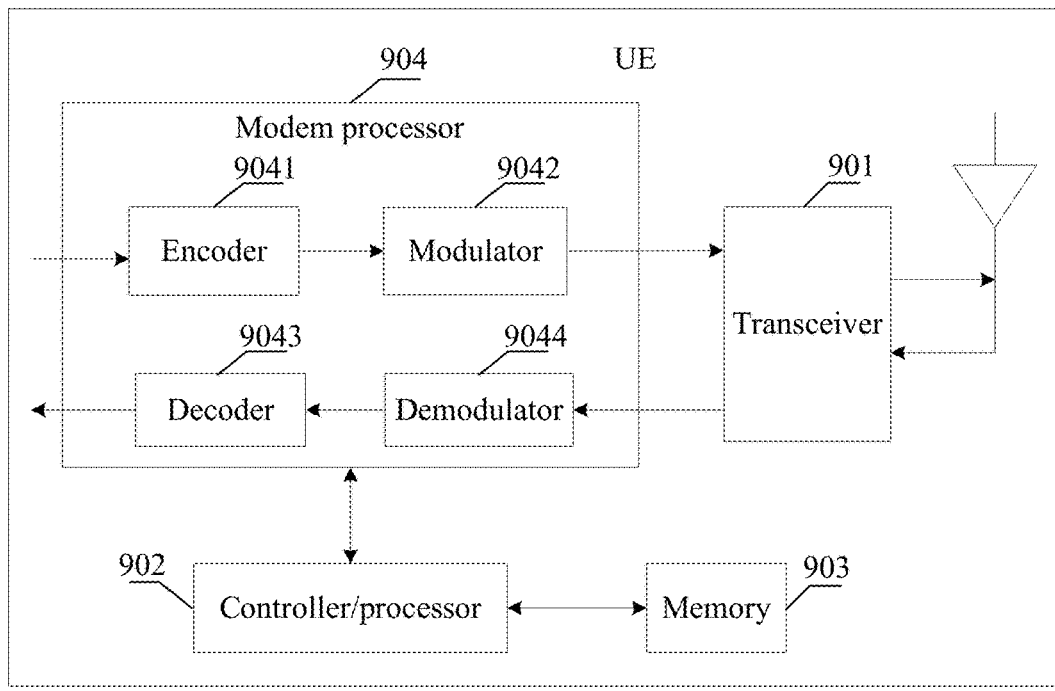
FIG. 9 is another schematic structural diagram of UE according to an embodiment of this application.

FIG. 9 is a simplified schematic diagram of a possible design structure of UE in the foregoing embodiment. The UE includes a transceiver 901 and a controller/processor 902, and may further include a memory 903 and a modem processor 904. For example, the transceiver 901 includes a receiver, configured to perform step 202 in FIG. 2. The processor 902 is configured to perform step 204 in FIG. 2.

The transceiver 901 adjusts (for example, performs analog conversion, filtering, amplification, and up-conversion on) the output sampling and generates an uplink signal. The uplink signal is transmitted to the access device 104 in the foregoing embodiment by using an antenna. On a downlink, the antenna receives a downlink signal transmitted by the access device 104 in the foregoing embodiment. The transceiver 901 adjusts (for example, performs filtering, amplification, down-conversion, and digitization on) a signal received from the antenna and provides input sampling. In the modem processor 904, an encoder 9041 receives service data and a signaling message that are to be sent on an uplink, and processes (for example, performs formatting, coding, and interleaving on) the service data and the signaling message. A modulator 9042 further processes (for example, performs symbol mapping and modulation on) coded service data and a coded signaling message, and provides output sampling. A demodulator 9044 processes (for example, demodulates) the input sampling and provides symbol estimation. A decoder 9043 processes (for example, performs de-interleaving and decoding on) the symbol estimation and provides decoded data and a decoded signaling message that are to be sent to the UE. The encoder 9041, the modulator 9042, the demodulator 9044, and the decoder 9043 may be implemented by the integrated modem processor 904. These units perform processing by using a radio access technology (such as an access technology of LTE or another evolved system) used by a radio access network.

The controller/processor 902 controls and manages an action of the UE, and is configured to perform processing performed by the UE in the foregoing embodiment. For example, the controller/processor 902 may be configured to: when a first application triggers a first service, determine, based on session type information, whether a create session request needs to be initiated for the first service. The memory 903 is configured to store program code and data of the UE.

Figure 10:
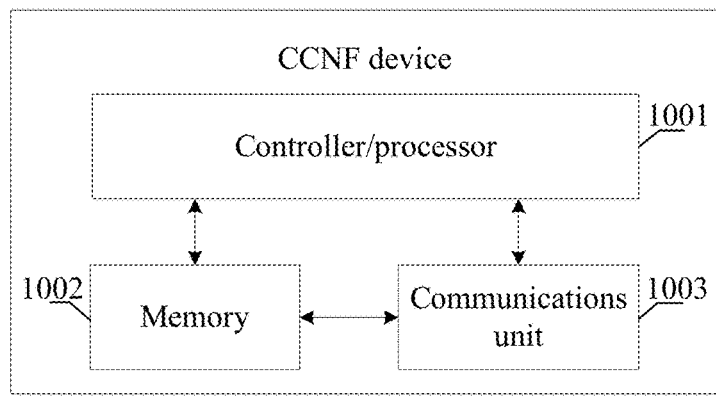
FIG. 10 is another schematic structural diagram of a CCNF device according to an embodiment of this application.

FIG. 10 is a simplified schematic diagram of a possible design structure of the CCNF device in the foregoing embodiment. The CCNF device may be the CCNF device 108 in FIG. 1. The CCNF device may include a controller/processor 1001, a memory 1002, and a communications unit 1003. The controller/processor 1001 may be configured to coordinate resource management and configuration between a plurality of slices. The memory 1002 may be configured to store program code and data of a control node. The communications unit 1003 is configured to support the CCNF device in communicating with another network element. For example, the communications unit 1003 includes a receiver and a transmitter. In an example, the receiver is configured to support the CCNF device in performing step 301, step 304, and step 309 in FIG. 3A, step 317 in FIG. 3B, step 323 in FIG. 3C, or step 331 and step 334 in FIG. 3D. The transmitter is configured to support the CCNF device in performing step 302, step 306, step 309, and step 342 in FIG. 3A, step 319 in FIG. 3B, step 325 in FIG. 3C, or step 332, step 336, and step 342 in FIG. 3D.

Figure 11:
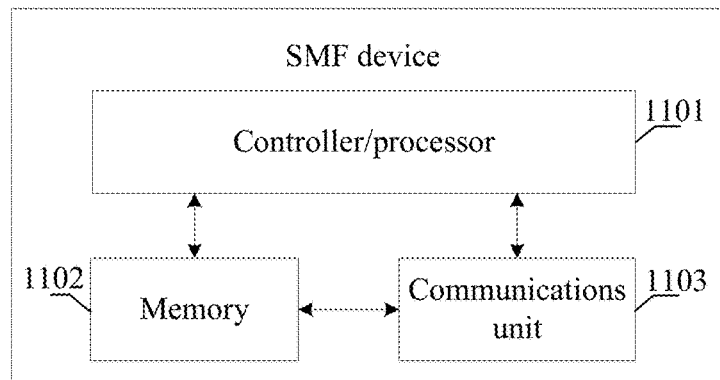
FIG. 11 is another schematic structural diagram of an SMF device according to an embodiment of this application.

FIG. 11 is a simplified schematic diagram of a possible design structure of the SMF device in the foregoing embodiment. The SMF device may include a controller/processor 1101, a memory 1102, and a communications unit 1103. The controller/processor 1101 may be configured to coordinate resource management and configuration between a plurality of slices. The memory 1102 may be configured to store program code and data of a control node. The communications unit 1103 is configured to support the SMF device in communicating with another network element. For example, the communications unit 1103 includes a receiver and a transmitter. In an example, the receiver is configured to support the SMF device in performing step 306 in FIG. 3A, step 312 and step 314 in FIG. 3B, or step 336 and step 340 in FIG. 3D. The transmitter is configured to support the SMF device in performing step 309 in FIG. 3A, step 313 and step 316 in FIG. 3B, or step 342 in FIG. 3D.

The controller/processor for performing the functions of the foregoing UE, the foregoing CCNF device, or the foregoing SMF device in this application may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The controller/processor may implement or execute various example logical blocks, modules, and circuits described in combination with the content disclosed in this application. Alternatively, the processor may be a combination of processors implementing a computing function, for example, a combination of one or more microprocessors, or a combination of a DSP and a microprocessor.

In addition, this application further discloses a communications system, including the foregoing CCNF device and the foregoing SMF device.

Method or algorithm steps described in combination with the content disclosed in this application may be implemented by hardware, or may be implemented by a processor executing a software instruction. The software instruction may include a corresponding software module. The software module may be stored in a RAM memory, a flash memory, a ROM memory, an EPROM memory, an EEPROM memory, a register, a hard disk, a removable hard disk, a CD-ROM, or a storage medium in any other form well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in user equipment. Certainly, the processor and the storage medium may exist in the user equipment as discrete components.

A person skilled in the art should be aware that in the foregoing one or more examples, functions described in this application may be implemented by hardware, software, firmware, or any combination thereof. When the functions are implemented by software, the functions may be stored in a computer readable medium or transmitted as one or more instructions or code in the computer readable medium. The computer readable medium includes a computer storage medium and a communications medium, and the communications medium includes any medium that enables a computer program to be transmitted from one place to another. The storage medium may be any available medium accessible to a general-purpose or dedicated computer.

The objectives, technical solutions, and benefits of this application are further described in detail in the foregoing specific embodiments. It should be understood that the foregoing descriptions are merely specific implementations of this application, but are not intended to limit the protection scope of this application. Any modification, equivalent replacement, or improvement made within the spirit and principle of this application shall fall within the protection scope of this application.

What is claimed is:

1. A session processing method comprising:
obtaining, by user equipment (UE), session type information, wherein the session type information indicates a type of a first session, the session type information comprises a data network name (DNN), supported by the first session, and the session type information further comprises at least one of a type of a service supported by the first session and a type of a slice supporting the first session; and
in response to a first application triggering a first service, determining, by the UE based on the session type information, whether a create session request needs to be initiated for the first service.

2. The method according to claim 1, wherein the determining, by the UE based on the session type information, whether the create session request needs to be initiated for the first service comprises:
determining, by the UE based on the session type information and a preconfigured correspondence among (a) the first application, (b) a DNN accessed by the first application, and (c) a type of the first service or a type of a slice required for supporting the first service, whether there is a created session that supports the DNN accessed by the first application, and supports at least one of the type of the first service or the type of the slice supporting the first session.

3. The method according to claim 2, wherein in response to there being the created session that can support the DNN accessed by the first application and at least one of the type of the first service or the type of the slice supporting the first session, the UE reuses the created session for the first application to access the DNN.

4. The method according to claim 2, wherein in response to there being no created session that can support the DNN accessed by the first application and at least one of the type of the first service or the type of the slice supporting the first session, the UE determines to initiate the create session request for the first service.

5. The method according to claim 1, wherein the obtaining, by the UE, the session type information comprises:
obtaining, by the UE, the session type information in a create session procedure; or obtaining, by the UE, the session type information in an initial attach procedure; or obtaining, by the UE, the session type information in a tracking area update procedure.

6. The method according to claim 1, wherein the obtaining, by the UE, the session type information comprises:
receiving, by the UE, a create session response message from a session management function (SMF) device, wherein the create session response message carries the session type information.

7. The method according to claim 1, wherein the obtaining, by the UE, the session type information comprises:
obtaining, by the UE, the session type information in an initial attach procedure.

8. The method according to claim 1, wherein the obtaining, by the UE, the session type information comprises:
obtaining, by the UE, the session type information in a tracking area update procedure.

9. A communication device comprising:
a receiver, configured to cooperate with a processor to obtain session type information, wherein the session type information indicates a type of a first session, the session type information comprises a data network name (DNN), supported by the first session, and the session type information further comprises at least one of a type of a service supported by the first session and a type of a slice supporting the first session; and
the processor, configured to: in response to a first application triggering a first service, determine, based on the session type information, whether a create session request needs to be initiated for the first service.

10. The communication device according to claim 9, wherein the processor is configured to: determine, based on the session type information and a preconfigured correspondence among (a) the first application, (b) a DNN accessed by the first application and (c) a type of the first service or a type of a slice required for supporting the first service, whether there is a created session that supports the DNN accessed by the first application, and at least one of the type of the first service or the type of the slice supporting the first session.

11. The communication device according to claim 10, wherein the processor is configured to: in response to there being the created session that can support the DNN accessed by the first application and at least one of the type of the first service or the type of the slice supporting the first session, the communication device reuses the created session for the first application to access the DNN.

12. The communication device according to claim 10, wherein the processor is configured to: in response to there being no created session that can support the DNN accessed by the first application and at least one of the type of the first service or the type of the slice supporting the first session, the communication device determines to initiate the create session request for the first service.

13. The communication device according to claim 9, wherein the receiver is configured to cooperate with the processor to obtain the session type information in a create session procedure.

14. The communication device according to claim 13, wherein the receiver is configured to cooperate with the processor to receive a create session response message from a session management function (SMF) device, wherein the create session response message carries the session type information.

15. A session processing system comprising: a user equipment (UE) and a session management function (SMF) device, wherein
the SMF device, is configured to send a create session response message to the UE, wherein the create session response message carries a session type information, the session type information indicates a type of a first session, the session type information comprises a data network name (DNN) supported by the first session, and the session type information further comprises at least one of a type of a service supported by the first session and a type of a slice supporting the first session;
the UE is configured to receive the create session response message, and in response to a first application triggering a first service, determine based on the session type information, whether a create session request needs to be initiated for the first service.

16. The system according to claim 15, wherein when determining whether the create session request needs to be initiated for the first service, the UE is configured to:
determine based on the session type information and a preconfigured correspondence among (a) the first application, (b) a DNN accessed by the first application and (c) a type of the first service or a type of a slice required for supporting the first service, whether there is a created session that supports the DNN accessed by the first application, and supports at least one of the type of the first service or the type of the slice supporting the first session.

17. The system according to claim 16, wherein the UE is configured to: reuse the created session for the first application to access the DNN in response to there being a created session that can support the DNN accessed by the first application and at least one of the type of the first service or the type of a slice supporting the first session.

18. The system according to claim 16, wherein the UE is configured to: determine to initiate the create session request for the first service in response to there being no created session that can support the DNN accessed by the first application and at least one of the type of the first service or the type of the slice supporting the first session.

19. The system according to claim 15, wherein the UE is configured to: receive a create session response message from a session management function (SMF) device, wherein the create session response message carries the session type information.

* * * * *